(12) United States Patent
Klatt

(10) Patent No.: US 9,462,613 B2
(45) Date of Patent: Oct. 4, 2016

(54) METHOD AND SYSTEM FOR GEOGRAPHICALLY SELECTIVE HANDLING OF BROADCAST MESSAGES IN A MOBILE RADIO ACCESS NETWORK

(75) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 989 days.

(21) Appl. No.: 13/513,590

(22) PCT Filed: Nov. 30, 2010

(86) PCT No.: PCT/EP2010/007245
§ 371 (c)(1),
(2), (4) Date: Aug. 13, 2012

(87) PCT Pub. No.: WO2011/066938
PCT Pub. Date: Jun. 9, 2011

(65) Prior Publication Data
US 2012/0295536 A1    Nov. 22, 2012

Related U.S. Application Data

(60) Provisional application No. 61/265,958, filed on Dec. 2, 2009.

(30) Foreign Application Priority Data

Dec. 2, 2009 (EP) .................................. 09014943

(51) Int. Cl.
*H04B 17/00* (2015.01)
*H04W 76/00* (2009.01)
(Continued)

(52) U.S. Cl.
CPC ........... *H04W 76/002* (2013.01); *H04W 4/021* (2013.01); *H04W 4/06* (2013.01)

(58) Field of Classification Search
CPC ..... H04W 68/00; H04W 8/26; H04W 4/021; H04W 4/06; H04W 72/0406; H04W 76/002; H04B 1/00

USPC ................ 455/67.11, 3.03, 403, 404.2, 405, 455/422.1, 432.2, 456.1, 456.3, 507; 370/230, 312, 335; 714/748
See application file for complete search history.

(56) References Cited

U.S. PATENT DOCUMENTS 5,216,675 A * 6/1993 Melliar-Smith et al. ..... 714/748
5,636,245 A    6/1997 Ernst
(Continued)

FOREIGN PATENT DOCUMENTS

| EP | 1199902 A1 | 4/2002 |
|---|---|---|
| JP | 2005244873 A | 9/2005 |
| JP | 2008099291 A | 4/2008 |
| WO | 0030379 A1 | 5/2000 |

OTHER PUBLICATIONS

European Patent Office, International Search Report in International Patent Application No. PCT/EP2010/007245 (May 2, 2011).
(Continued)

*Primary Examiner* — Shaima Q Aminzay
(74) *Attorney, Agent, or Firm* — Leydig, Voit & Mayer, Ltd.

(57) ABSTRACT

A method for sending a broadcast message in a mobile telecommunications network to a mobile terminal within a local radio coverage area of the mobile telecommunications network, the radio coverage area having a radio access network entity for broadcasting the broadcast message, includes: receiving, at the mobile terminal, the broadcast message, wherein the broadcast message includes geographical validity information based on a definition of a subarea of the radio coverage area; validating, by the mobile terminal, the broadcast message based on the geographical validity information and location information relating to the geographical location of the mobile terminal; and decoding content of the broadcast message only if validation of the broadcast message is positive.

16 Claims, 3 Drawing Sheets

(51) Int. Cl.
*H04W 4/02* (2009.01)
*H04W 4/06* (2009.01)

(56) References Cited

U.S. PATENT DOCUMENTS

| | | |
|---|---|---|
| 2002/0183075 A1* | 12/2002 | Fauconnier .................. 455/456 |
| 2005/0201316 A1 | 9/2005 | Fukuhara et al. |
| 2008/0089265 A1 | 4/2008 | Park et al. |
| 2010/0178895 A1 | 7/2010 | Maeda et al. |

OTHER PUBLICATIONS

European Patent Office, European Search Report in European Patent Application No. EP 09 01 4943 (May 2, 2010).

3GPP TS 22.268 V9.2.0 (Jun. 2009) $3^{rd}$ Generation Partnership Project; Technical Specification Group Services and System Aspects Public Warning System (PWS) Requirements (Release 9), Jun. 2009.

* cited by examiner

METHOD AND SYSTEM FOR GEOGRAPHICALLY SELECTIVE HANDLING OF BROADCAST MESSAGES IN A MOBILE RADIO ACCESS NETWORK

CROSS-REFERENCE TO RELATED APPLICATIONS

This patent application is a national stage entry under 35 U.S.C. §371 of International Application No. PCT/EP2010/007245, filed Nov. 30, 2010, and claims priority to European Patent Application No. EP 09014943.6, filed Dec. 2, 2009, and U.S. Provisional Patent Application No. 61/265,958, filed Dec. 2, 2009. The International Application was published in English on Jun. 9, 2011, as WO 2011/066938 A1.

FIELD

The present invention relates to a method and a program for geographically selective handling of broadcast messages in a preferably cellular mobile network like, GERAN, UTRAN, LTE/E-UTRAN, LTE-Advanced, cdma2000, WiMAX, WiBro, etc., wherein the broadcast message to a mobile terminal is handled differently if the mobile terminal is located in a defined subarea of the broadcast area (e.g., only within a selected geographical subarea of a cell). The invention is also applicable to the handling or delivery of broadcast messages of other wireless radio technologies which are not referred as to be "cellular networks", like: DVB-T, DVB-S, DAB, DMR, RDS, satellites, etc.

BACKGROUND

For cellular mobile radio networks like GERAN, UTRAN, LTE/E-UTRAN, LTE-Advanced, cdma2000, WiMAX, WiBro, etc., broadcast capabilities have been designed which range from SMS cell broadcast (SMS-CB), invented for GSM where the service allows the delivery of short, mainly text based limited length messages, over MBMS (Multimedia Broadcast and Multicast Service) or IMB (Integrated Multimedia Broadcast) for UTRAN in 3GPP Rel-6 and enhanced Multimedia Broadcast and Multicast Service (eMBMS) for LTE/E-UTRAN in 3GPP Rel-9 or later. Later technologies allow distribution of multimedia content, and also text or graphic services in a broadcast fashion. Also, there are non-cellular mobile technologies to deliver multimedia content (e.g. MobileTV), namely DVB-T/-H/-S, MediaFLO, DMB, etc. Another area gaining interest for the delivery of broadcast messages is the request of authorities to enable a warning system for the public (mobile cellphone users) in case of emergency—in this area, different approaches exist due to differing requirements from different local authorities. Prominent examples of such technologies defined by 3GPP for mobile users are ETWS (Earthquake and Tsunami Warning System) mainly used in Asian markets, PWS/CMAS (Public Warning System/Commercial Mobile Alert System) mainly used in North America, and SMS-CB (currently under discussion in Europe).

Conventional approaches have a common principle: that a message is delivered to all or a selected number of terminal devices in a PLMN or subpart of a PLMN. The minimum geographical area where messages can be delivered is a single cell for cellular mobile communications networks. In more general terms (including also the case of non-cellular transmission modes of mobile communication networks), the minimum geographical area where messages can be delivered is a local radio coverage area typically served by a radio access network entity like a base transceiver station or another device having a radio antenna for broadcast purposes. Typically, a cellular network includes a multitude of radio cells. A radio cell is the geographic area of the cellular mobile network in which the radio signal transmitted by a base station can be received. In most of the cellular technologies the range of a macro base station is in the order of 500 meters to 1000 meters in urban areas while typically in rural areas cells have a radius of 5 kilometers to 10 kilometers and even higher up to 135 kilometers in UMTS for specific frequency bands. In non-cellular radio technologies the coverage area of a single base station is normally much larger, e.g. 50 kilometers to 100 kilometers in DVB-T and several hundred kilometers when using satellite broadcasting technologies like DVB-S.

This means that with conventional technologies, a cell broadcast event or a broadcast action within the local radio coverage area (of a radio access network entity) means that many mobile terminals might be involved even in such cases where only a specific geographical part or subarea of the local radio coverage area are concerned or should be concerned by the cell broadcast (or local radio coverage area broadcast) event. With current wireless technologies, the minimum geographical delivery area of broadcast messages corresponds to the area of a cell (or local radio coverage area).

SUMMARY

In an embodiment, the present invention provides a method for sending a broadcast message in a mobile telecommunications network to a mobile terminal within a local radio coverage area of the mobile telecommunications network, wherein the radio coverage area has a radio access network entity for broadcasting the broadcast message. The method includes: receiving, at the mobile terminal, the broadcast message, wherein the broadcast message includes geographical validity information based on a definition of a subarea of the radio coverage area; validating, by the mobile terminal, the broadcast message based on the geographical validity information and location information relating to the geographical location of the mobile terminal; and decoding content of the broadcast message only if validation of the broadcast message is positive.

DETAILED DESCRIPTION

Figure 1:
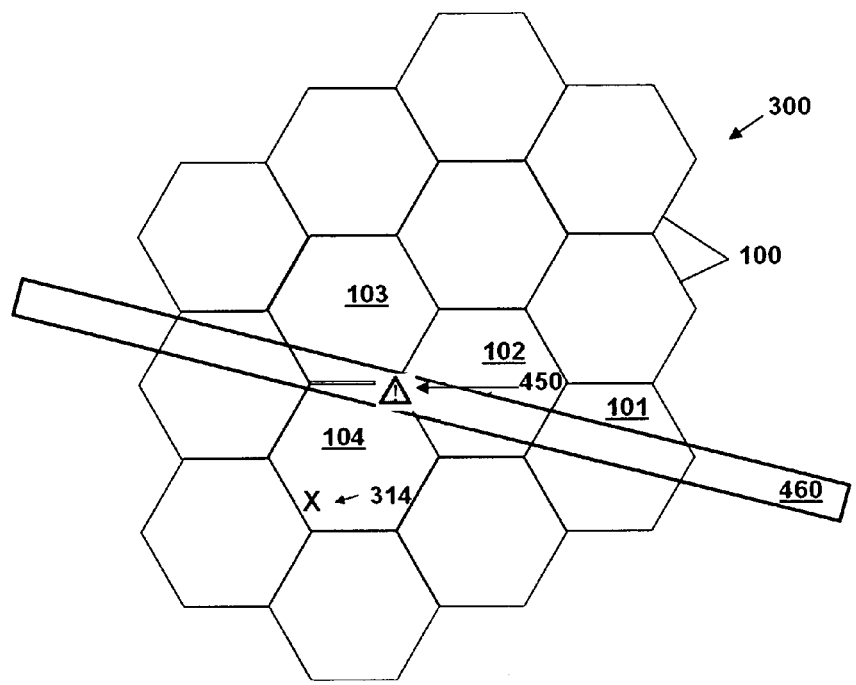
FIG. 1 schematically illustrates a plurality of cells of a conventional cellular telecommunications network.

Embodiments of the present invention provide a method, a system, a mobile terminal and a program for geographically selective handling of a broadcast message or of a corresponding service in any radio transmission based system, e.g. in a cellular mobile telecommunications network, in order to enhance quality of service to the user of the system and the mobile terminal and to reduce associated costs.

In an embodiment, the present invention provides a method for sending a broadcast message in a mobile telecommunications network to a mobile terminal within a local radio coverage area of the mobile telecommunications network, wherein the radio coverage area has a radio access network entity for broadcasting the broadcast message, wherein in a first step and prior to sending the broadcast message, a subarea of the radio coverage area is defined, wherein the broadcast message includes a geographical validity information dependent on the definition of the subarea of the radio coverage area, and wherein in a second step after transmitting the broadcast message, a validation of the broadcast message is performed by the mobile terminal dependent on the geographical validity information and dependent on a location information related to the geographical location of the mobile terminal.

It is thereby advantageously possible that the mobile terminal (in the following also called "UE" or User Equipment) which is capable of identifying its geographical location (e.g. by GPS (GNSS, Global Navigation Satellite System) receiver) within a mobile telecommunications network (in the following also called "geo-aware UE") can handle broadcast messages in a subpart or subarea of the local radio coverage area differently compared to the handling of the broadcast messages in the case where the mobile terminal would be located in the rest of the local radio coverage area. The method therefore allows for a definition of a geographic region independently from the geographic boundaries of radio coverage areas or cells of a mobile telecommunications network and the handling of the broadcast messages differs dependent on whether the mobile terminal receiving the broadcast message is located inside the geographic region or not. For one cell of a cellular telecommunications network or for one radio coverage area, the part belonging to the geographic region is hereinafter also called the subarea (with the specific handling of broadcast messages). If the geographic region (with the specific handling of broadcast messages) does not cross the boundaries of a cell or radio coverage area, then the geographic region with specific handling of broadcast messages is identical to the subarea of such a cell. If the geographic region (with the specific handling of broadcast messages) does cross the boundaries of a cell or radio coverage area, then the geographic area is also called a continuous geographic area (including a plurality of subareas of different cells or radio coverage areas. In the latter case (i.e. the geographic region does cross the boundaries of a cell or radio coverage area), it is of course possible that the continuous geographic area includes one or more cells completely, i.e. for such cells the subarea is identical to the area of the cell.

In an embodiment, the validation of the broadcast message is performed by the mobile terminal by processing the geographical validity information and wherein the content of the broadcast message is decoded solely in the case where a result of the validation of the geographical validity information relative to the geographical location of the mobile terminal is positive.

If the result of the validation of the geographical validity information relative to the geographical location and/or movement of the mobile terminal is negative (i.e. the geographical location and/or the direction of movement of (or detected by) the mobile terminal is such that in comparison to the definition of the geographical validity information (including potentially a direction dependent indication), the mobile terminal is not concerned by the broadcast message), there is no need to even receive (and hence there is no need to decode) the content of the broadcast message by the mobile terminal.

Thereby, it is advantageously possible to restrict the decoding of the complete content of the broadcast message to those messages where a result of the validation of the geographical validity information relative to the geographical location of the mobile terminal is positive, i.e. where the mobile terminal is located within the geographical boundaries defined by the geographical validity information or where the mobile terminal is not only located within the geographical boundaries defined by the geographical validity information but also has a direction of movement such that the detected direction of movement of the mobile terminal corresponds to a direction dependent indication of the geographical validity information.

Thereby, it is possible for the mobile terminal to save energy as only the contents (possibly including a relatively significant amount of data such as an image (or data representing an image) or a plurality of images, a video sequence or the like) of those broadcast messages are to be decoded where the result of the validation of the position and/or the direction of movement of the mobile terminal with respect to the geographical validity information is positive.

In an embodiment, the geographical validity information is transmitted to the mobile terminal on a control channel (especially the MCCH (Multicast Control Channel) when using a public land mobile network according to the Universal Mobile Telecommunication System (UMTS) or according to the Long Term Evolution (LTE) standard), and the corresponding message content is transmitted to the mobile terminal on a transport channel (especially the MTCH (Multicast Transport Channel) in case of using a public land mobile network according to the Universal Mobile Telecommunication System (UMTS) or according to the Long Term Evolution (LTE) standard).

In a further embodiment, the geographical validity information (of a broadcast message) includes reference information for pointing to or for referring to the content of the broadcast message. Thereby, it is advantageously possible to easily implement the content of the broadcast message being decoded solely in the case where the result of the validation of the geographical validity information relative to the geographical location (and/or the direction of movement) of the mobile terminal is positive.

In an embodiment, the time of transmission of the geographical validity information (of a given broadcast message) and the time of transmission of the corresponding content of this broadcast message differs by a minimum time delay of at least one transmission time interval (TTI). This means that this time delay is provided between the end of the transmission of the geographical validity information (of a given broadcast message) and the beginning of the transmission of the corresponding content of this broadcast message.

If this minimum time delay is not provided, the mobile terminal can also immediately start to receive the content of the corresponding broadcast message, but in this case it is not ensured that the mobile terminal also received the start of the content message and hence might only receive parts of the content message or has to rely on a re-transmission of the content message in order to get the entire content message.

A cell (of a cellular telecommunications network) corresponds to a radio coverage area of a network entity having at least one antenna device, such as e.g. a base station or NodeB or eNodeB. In particular, the term "cell" or "radio coverage area" also corresponds a group of so-called macro cells being defined as an (e)MBMS service area (MBMS service area according to UMTS or eMBMS service area according to LTE), typically operating as a MBSFN (MBMS Single Frequency Network), for better efficiency of (e)MBMS.

The method therefore provides for a geographically selective handling and/or delivery of broadcast messages in a radio environment including a geo-aware terminal (e.g. by having a GPS (GNSS, Global Navigation Satellite System) receiver integrated or attached) and a standard broadcast delivery method as further described below. In the following, embodiments of the invention are mainly described using an LTE/E-UTRAN system with an eMBMS functionality included. However, the applicability of the inventive method is not limited to this kind of scenario or arrangement. Hereinafter, the terms GPS and GNSS (Global Navigation Satellite System) are used synonymously, i.e. in case GPS is mentioned also GNSS is meant and vice versa.

In an embodiment, the local radio coverage area is a cell of the mobile telecommunications network having a base transceiver station as the radio access network entity, and wherein a minimum granularity for the delivery of the broadcast message is restricted to the area of such a cell, wherein the cell is preferably a macro cell of a cellular mobile telecommunications network.

A broadcast message can refer to one or a plurality of data units carrying content information for providing a broadcast service such as, e.g. mobile TV, text-based or graphic-based content for stock information, weather information or other services like books/movies/podcasts on demand. Such a reference or link between the one or the plurality of broadcast message to the data unit or data units can, e.g. be provided by way of a geographic identifier information either identical to the geographic validity information (as part of the broadcast message) or referring to the geographic validity information.

In a further embodiment:
the mobile telecommunications network is a network according to a standard according to at least one of the group including UMTS (Universal Mobile Telecommunications Standard), cdma2000 (Code Division Multiple Access 2000), LTE (Long Term Evolution), LTE-Advanced (Long Term Evolution Advanced) or WiMAX (Worldwide Interoperability for Microwave Access), and
the transmission of the broadcast message from the radio access network entity to the mobile terminal is performed using at least one of the group including SMS-CB (Short Message System Cell Broadcast), MBMS (Multicast Broadcast Multimedia Service), eMBMS (evolved Multicast Broadcast Multimedia Service), PWS (ETWS or CMAS) or any other broad- or multicast system like DMB, DVB-H/-T/-S, WiBro.

In an embodiment, the geographical validity information defining the subarea (or the subareas of a plurality of cells, i.e. the continuous geographic area) includes at least one geographic reference information, preferably one piece of GPS reference information and a radius information defining a circle or at least three or four pieces of GPS reference information defining a polygon, especially a triangle or a tetragon or any other freely defined form. Other examples of geographical definitions of the subarea or the subareas of a plurality of cells, i.e. the continuous geographic area, include the following cases:

a subarea or a continuous geographic area following a road or a motorway or a railway line and having a certain width larger than the width of the road or motorway or railway line, i.e. a rectangular subarea or continuous geographic area in case of a straight part of the road, motorway or railway line and a "curved rectangular" (or superposition of a plurality of rectangles following the road, motorway or railway line) in case of a curved road, motorway or railway line.

a subarea or a continuous geographic area following generally the boundaries of an administrative district or entity such as a region or a federal state (e.g. a Bundesland in Germany) or a department (e.g. in France) or a county (e.g. Landkreis or Stadtbezirk in Germany).

Thereby, it is advantageously possible that a specific geographical part of a radio cell, or, generally speaking, of the local radio coverage, can be easily designated, and information corresponding to that geographical part can be transmitted easily and without involving substantially higher costs or network traffic (since messages are handled differently by mobile terminals located in the designated subarea of the radio cell compared to mobile terminals outside of the designated subarea of the radio cell).

In a further embodiment, the geographical validity information includes a direction dependent indication allowing the mobile terminal to validate the broadcast message dependent on the geographical validity information and dependent on the direction of travel of the mobile terminal.

It is thereby advantageously possible to further differentiate between mobile terminals being all located within the subarea of the radio cell corresponding to the geographical validity information but moving in different, especially in opposite, directions. By using the direction of travel of the mobile terminal, it is advantageously possible to differentiate between mobile terminals being all located within the subarea of the radio cell corresponding to the geographical validity information but moving in different, especially in opposite, directions. It is possible that the direction of travel of the mobile terminal is stored within the mobile terminal such that the direction of travel (of the mobile terminal) taken into consideration when evaluating the geographical validity information, is not necessarily the instantaneous direction of travel but
either an average direction of travel corresponding to a predetermined interval of time or corresponding to a predetermined distance,
or—in case that the mobile terminal is currently more or less stationary—the last measured direction of travel of the mobile terminal.

Thereby, it is advantageously possible that incoming broadcast messages are evaluated by the mobile terminal in a more efficient manner for the user of the mobile terminal.

In a further embodiment, the geographical validity information refers to a continuous geographic area corresponding to a multitude of subareas of a multitude of cells of the mobile telecommunications network.

It is thereby advantageously possible that the geographical validity information corresponds to an area spanning over a multitude of radio cells such that a plurality of subareas of a plurality of cells are designated by the geographical validity information.

In a further embodiment, the broadcast message is transmitted to a further mobile terminal within the local radio coverage area of the mobile telecommunications network, the further mobile terminal lacking a location information related to the geographical location of the further mobile terminal, wherein the further mobile terminal either validates or invalidates the broadcast message in the second step after transmitting the broadcast message.

It is thereby advantageously possible to use the inventive method also for such mobile terminals that are not geo-aware, i.e. that are not equipped with (or are not assigned to) means (such as a GPS device) for determining the location information related to the geographical location of the further mobile terminal.

An exemplary embodiment of the method is briefly described by the following steps: A geo-aware UE receives a broadcast message and is located in a subarea of a radio cell. The main application is the usage of the described method in a macro cell of a LTE network in a rural area (relatively large macro cells), but the invention is not limited thereto. Preferably, the broadcast message should only be handled by a UE in a well defined part of the given macro cell. Applications for such a scenario are for example road traffic updates or local weather warnings. For the method it is required that beside the reception capabilities in the UE, the network supports the, e.g., eMBMS service and the UE is geo-aware, i.e. "knows" its geographical location by way of a location information generated, e.g. by a GPS unit, the location information corresponding to the geographical location of the mobile terminal. Embodiments of the present invention is to allow a completely unrestricted definition of a geographical area (especially with regard to smaller geographical areas or subareas of a local radio coverage area) in which the broadcast message shall be treated or handled differently by mobile terminals (in contrast to conventional systems where the broadcast message is received and handled by all mobile terminals in the entire coverage area (or the current cell serving the mobile terminal) in the same manner irrespective of the geographical location of the mobile terminal within the radio coverage area. Besides the restriction that the broadcast message cannot be delivered or treated in a subarea of a radio cell differently than in the residual radio cell, and especially with regard to larger geographical areas than a local radio coverage area, no further area restrictions exist nowadays (i.e. it is possible to deliver the broadcast message in a number of cells representing a cluster of cells (called e.g. eMBMS service area) or multiple single cells spread over an area. This means that, according to embodiments of the present invention, it is possible to freely define a geographical area of a cellular network where geo-aware UEs are notified that specific broadcast messages shall be received and delivered to the end customer or an end customer application. In particular, it is possible for the mobile operator of a cellular network to freely define the geographical area in which the broadcast message shall be delivered to geo-aware mobile terminals in such a way that an adapted handling by the mobile terminals of such broadcast messages is facilitated. The definition of the geographical subarea of a local radio coverage area (or of radio cell in a cellular telecommunications network) is possible to range from 1 meter to several hundred of kilometers inside a single local radio coverage area (especially a macro cell) without any size limitations or shape restrictions.

In a further embodiment, the present invention provides a system for sending a broadcast message, the system including a mobile telecommunications network and a mobile terminal within a local radio coverage area of the mobile telecommunications network, wherein the radio coverage area has a radio access network entity for broadcasting the broadcast message, wherein prior to sending the broadcast message, a subarea of the radio coverage area is defined, wherein the broadcast message includes a geographical validity information dependent on the definition of the subarea of the radio coverage area, and wherein after transmitting the broadcast message, a validation of the broadcast message is performed by the mobile terminal dependent on the geographical validity information and dependent on a location information related to the geographical location of the mobile terminal.

In a further embodiment,
  the local radio coverage area is a cell of the mobile telecommunications network having a base transceiver station as the radio access network entity, and wherein a minimum granularity for the delivery of the broadcast message is restricted to the area of such a cell, wherein the cell is preferably a macro cell,
  the mobile telecommunications network is a network according to at least one of the group including UMTS (Universal Mobile Telecommunications Standard), cdma2000 (Code Division Multiple Access 2000), LTE (Long Term Evolution), LTE-Advanced (Long Term Evolution Advanced) or WiMAX (Worldwide Interoperability for Microwave Access) standard,
  the geographical validity information defining the subarea includes at least one GPS reference information, preferably one piece of GPS reference information and a radius information defining a circle or at least three pieces of GPS reference information defining a polygon, and
  the geographical validity information refers to a continuous geographic area corresponding to a multitude of subareas of a multitude of cells of the mobile telecommunications network.

In a further embodiment, the present invention provides a mobile terminal for receiving a broadcast message, the mobile terminal being located within a local radio coverage area of a mobile telecommunications network, wherein the broadcast message includes a geographical validity information relative to a subarea of the radio coverage area, wherein preferably the geographical validity information includes a direction dependent indication, and wherein the mobile terminal validates the broadcast message dependent on the geographical validity information and dependent on a location information related to the geographical location of the mobile terminal, and preferably dependent on a direction of travel of the mobile terminal.

In further embodiments, the present invention provides:
  a program having a computer readable program code for controlling a mobile terminal or for controlling a system and
  a computer program product including a computer readable program code.

Exemplary embodiments of the present invention will be described with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

FIG. 1 schematically illustrates a plurality of cells 100 of a conventional cellular telecommunications network 300. The smallest possible broadcast delivery area (or minimum broadcast delivery area) is defined by a single cell 100. To warn cars about an accident 450 along the motorway 460 at least a first cell 101, a second cell 102, a third cell 103 and a fourth cell 104 need to be defined as the broadcast area. Thus, in this conventional system, there is the negative side effect of broadcasting the broadcast message (e.g. informing about the accident on the motorway) in the first, second, third and fourth cell 101, 102, 103, 104 that also broadcast receivers far away from the motorway 460, e.g. located at the position of a mobile terminal 314, will receive the broadcast warning message and handle it according to predefined handling rules even though the broadcast message is probably not relevant for the user of this mobile terminal 314.

Figure 2:
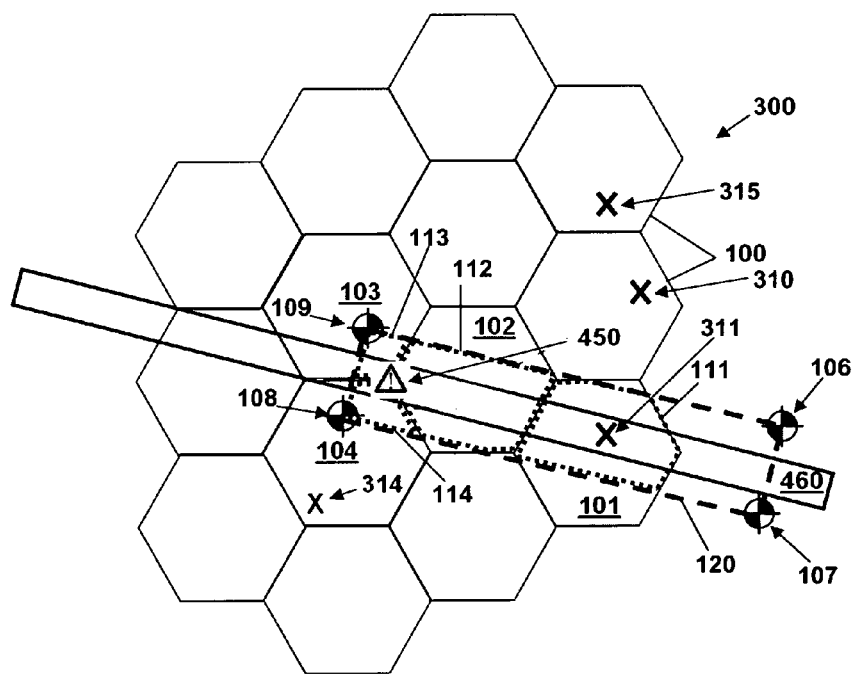
FIG. 2 schematically illustrates a plurality of cells of a system according to a first exemplary embodiment of the present invention.
Figure 3:
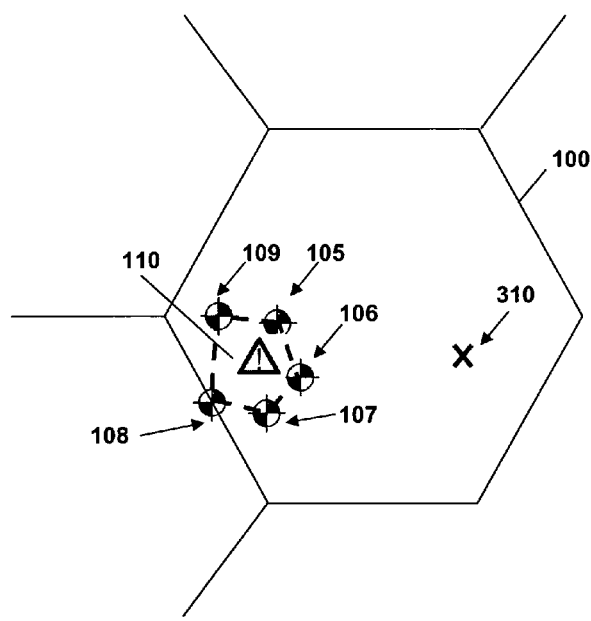
FIG. 3 schematically illustrates a plurality of cells of a system according to a second exemplary embodiment of the present invention.

FIG. 2 schematically illustrates a plurality of cells 100 of a cellular telecommunications network 300 according to an exemplary embodiment of the present invention. FIG. 3 schematically illustrates a cell 100 of a cellular telecommunications network 300 according to another exemplary embodiment of the present invention.

FIG. 3 shows the situation where the geographic region (with the specific handling of broadcast messages) does not cross the boundaries of the cell 100 or radio coverage area 100, which means that the geographic region with specific handling of broadcast messages is identical to the subarea 110 of such a cell 100. FIG. 2 shows the situation where the geographic region (with the specific handling of broadcast messages) does cross the boundaries of a cell 100 or radio coverage area 100, which means that the geographic area is also called a continuous geographic area 120 (including a plurality of subareas 111, 112, 113, 114 of different cells 101, 102, 103, 104 or radio coverage areas 101, 102, 103, 104).

It is possible that a geographical region or area within a cell 100 (or within a local radio coverage area 100 of a mobile telecommunications network 300), i.e. a subarea 110 can be defined such that a broadcast message includes a geographical validity information dependent on the definition of the subarea 110.

In the context of these figures, a cell or a local radio coverage area is normally designated by reference sign 100 and the subarea of a cell or of a local radio coverage area is normally designated by reference sign 110. In case different (e.g. neighbouring) cells 100 or different subareas 110 of different cells are to be specifically named, the reference signs 101, 102, 103, 104 and the names "first cell", "second cell", "third cell", "fourth cell" as well as the reference signs 111, 112, 113, 114 and the names "first subarea", "second subarea", "third subarea", "fourth subarea" are used.

A mobile terminal 310 or user equipment (UE) is normally designated by reference sign 310. In case different or specific mobile terminals 310 are to be specifically named, the reference signs 311, 312, 313, 314 and the names "first mobile terminal", "second mobile terminal", "third mobile terminal", "fourth mobile terminal" are used. In general, the mobile terminals 310 are either mobile terminals 310 that are geo-aware or mobile terminals 310 that are not intrinsically geo-aware but are connected or otherwise linked to a device generating the location information related to the geographical location of the mobile terminal. A mobile terminal that is not geo-aware, i.e. that does not have access to the location information related to the geographical location of the mobile terminal, is also called a further mobile terminal 315.

In the example schematically shown in FIG. 2, in order to warn cars about an accident 450 along the motorway 460, a continuous geographic area 120 (also called broadcast delivery area) is defined by way of a set of GPS reference points. In the example of FIG. 2, the continuous geographic area 120 includes at least a first subarea 111 of a first cell 101, a second subarea 112 of a second cell 102, a third subarea 113 of a third cell 103 and a fourth subarea 114 of a fourth cell 104. The continuous geographic area 120 is, e.g., defined as a polygon of four GPS points 106, 107, 108, 109 along the motorway 460. Mobile terminals being either located inside of the continuous geographic area 120 or outside of the continuous geographic area 120 that have access to a location information related to the geographical location of such mobile terminals (also called geo-aware mobile terminals or geo-aware UEs) are able to use the geographical validity information (of the broadcast message) and determine whether the broadcast message related to the accident on the motorway is relevant or not, i.e. they are able to perform a validation of the broadcast message. This means that mobile terminals located outside of the continuous geographic area 120, e.g. located far away from the motorway 460 such as a fourth mobile terminal 314, will probably not validate the broadcast message related to the accident. On the other hand, mobile terminals located inside the continuous geographic area 120 will validate the broadcast message.

FIG. 3 illustrates schematically another exemplary embodiment. A subarea 110 (also called broadcast delivery area) is defined as a subset of a single cell 100 (or local radio coverage area 100 for the case of a non-cellular mobile telecommunications network). FIG. 3 schematically illustrates a plurality of cells 100 of a cellular telecommunications network 300. One of these cells 100 includes a subarea 110 defined by a polygon made up of five points 105, 106, 107, 108, 109. Again, a broadcast message which includes a geographical validity information (dependent on the subarea 110) allows a geo-aware mobile terminal 310 to determine whether the broadcast message is relevant or not, i.e. they are able to perform a validation of the broadcast message. This means that mobile terminals located outside of the subarea 110 will probably not validate the broadcast message. On the other hand, mobile terminals located inside of the subarea 110 will validate the broadcast message.

Figure 4:
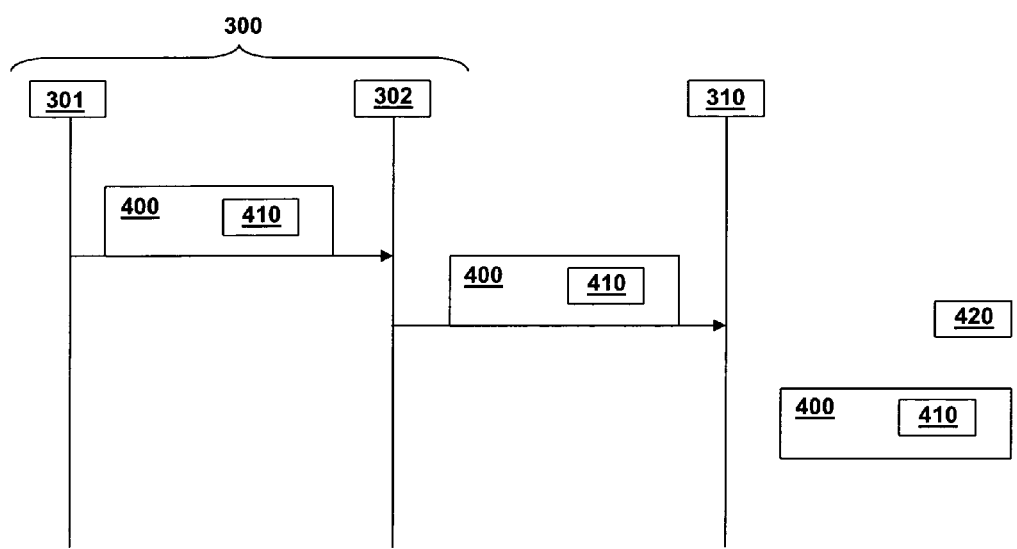
FIG. 4 schematically illustrates a message flow in an embodiment.

FIG. 4 schematically illustrates a message flow (as an example using a cellular network like UMTS or LTE). The cellular mobile telecommunications network 300 includes a core network 301 and a local radio access network entity 302 such as, e.g., an NodeB or an eNodeB (generally a base station). The radio access network entity 302 or base station 302 of each cell 100 is linked to the mobile terminals 310 in the respective radio cells 100. The broadcast message 400 including the geographical validity information 410 is transmitted from the core network 301 to the radio access network entity 302 and further to the mobile terminal 310. Prior to the transmission of the broadcast message 400, the geographical validity information 410 is defined dependent on the subarea 110 of the cell 100. In the situation of FIG. 3, where the subarea 110 is not part of a continuous geographic area 120 (as explained with reference to FIG. 2), the definition of the subarea 110 of the cell 100 is performed by way of geographical reference information such as GPS points or coordinates, the geographical reference information being located within the cell 100. It is possible to define the subarea 110 by way of at least three geographical points (e.g. the five points 105, 106, 107, 108 and 109 shown in FIG. 3). Alternatively, it is also possible to define the subarea 110 by way of one geographical point and an indication of a radius (not shown). In the situation of FIG. 2, where the subarea 110 is part of a continuous geographic area 120, the definition of the first, second, third and fourth subareas 111, 112, 113, 114 of the first, second, third and fourth cells 101, 102, 103, 104 (and hence the geographical validity information 420) is performed by way of geographical reference information such as GPS points or coordinates, the geographical reference information being either located within each of the cells 101, 102, 103, 104 or the geographical reference information being located at least partly outside the respective cells 101, 102, 103, 104. In the first case, the geographical validity information 420 differs from the first to the fourth subarea 111, 114 but taken together the different definitions of the subareas 111 to 114 result in the continuous geographic area 120. In the second case, the geographical validity information 420 is identical for the first to the fourth subarea 111, 114 related to the continuous geographic area 120. As with respect to the example of FIG. 3, it is possible to define the continuous geographic area 120 by way of at least three geographical points (e.g. the four points 106, 107, 108 and 109 shown in FIG. 2). Alternatively, it is also possible to define the continuous geographic area 120 by way of one geographical point and an indication of a radius (not shown).

The mobile terminal 310 is a geo-aware mobile terminal 310, i.e. location information 420 related to the geographical location of the mobile terminal 310 is available to the mobile terminal as represented in FIG. 4.

Figure 5:
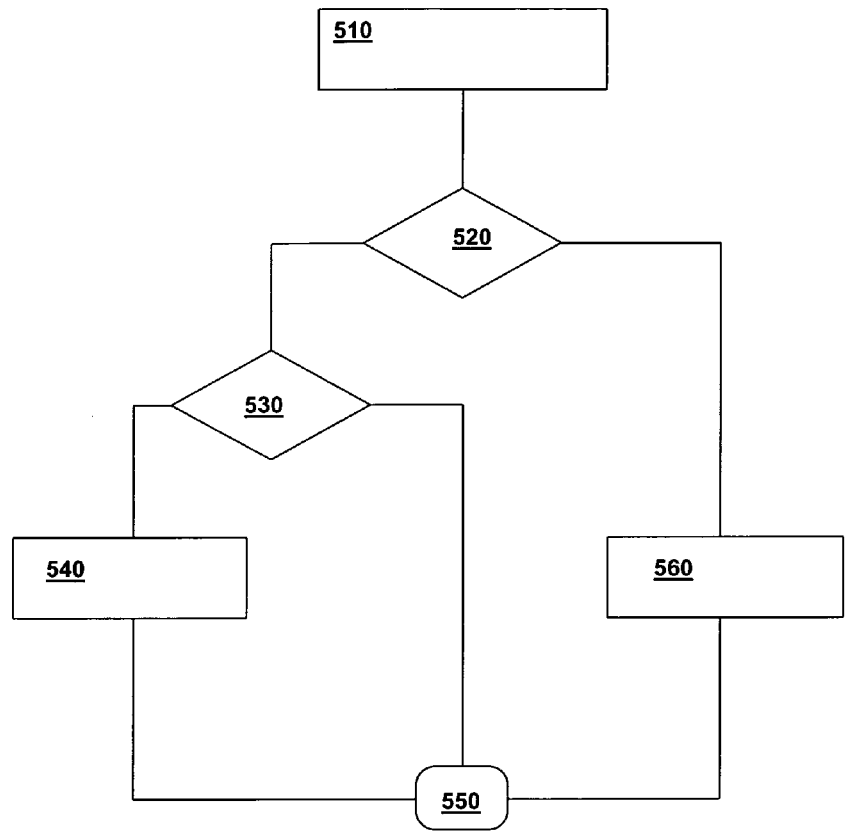
FIG. 5 schematically illustrates a flowchart corresponding to an embodiment.

FIG. 5 illustrates schematically a flow chart representing the handling of the broadcast message 400 inside the mobile terminal 310 to enable the inventive selective handling of broadcast messages 400 by a geo-aware mobile terminal 310. Initially (represented by reference numeral 510 in FIG. 5), the broadcast message is received by the mobile terminal 310. In a following situation (represented by reference numeral 520 in FIG. 5), a decision is taken whether the inventive adaptive handling of broadcast messages 400 is to be applied or not. If the inventive adaptive handling of broadcast messages 400 is to be applied (flow on the left hand side of FIG. 5), it is decided (especially by way of a comparison with the location information 420 related to the geographical location of the mobile terminal 310) in a subsequent situation (represented by reference numeral 530 in FIG. 5) whether the mobile terminal 310 is located inside of the subarea 110 of the cell 100. Dependent on this comparison, the adaptive handling of the broadcast message 400 is performed, e.g. when the mobile terminal 310 is located inside of the subarea 110, the delivery of the broadcast message is performed to a respective application, e.g. the broadcast message is displayed on a display of the mobile terminal 310. The handling of the broadcast message 400 when the mobile terminal 310 is located inside of the subarea 110 is represented in FIG. 5 by reference numeral 540. After the handling of the broadcast message has occurred, the program flow moves to an end state or idle state represented by reference numeral 550 in FIG. 5. In case that it is found (at the decision 530) that the mobile terminal 310 is located outside of the subarea 110, the program flow moves to the end state or idle state 550. Alternatively or additionally, it is also possible to have a (e.g. an alternative) handling in case that the mobile terminal 310 is located outside of the subarea 110.

When no selective or adaptive handling of broadcast messages is to be applied (at the decision 520), it is still possible that the handling of the broadcast message 400 occurs. This alternative is represented in FIG. 5 by reference numeral 560. After the handling of the broadcast message has occurred (560), the program flow moves to the end state or idle state 550. Alternatively in this case (that no selective or adaptive handling of broadcast messages is to be applied at the decision 520), the program flow moves to the end state or idle state 550.

Figure 6:
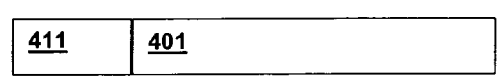
FIG. 6 schematically illustrates an example of a broadcast message.

In FIG. 6, an example of a broadcast message 400 is schematically shown. The example of the broadcast message 400 includes a first example 411 of a geographical validity information 410 and a first example of a corresponding message content 401 of the broadcast message. Preferably, the geographical validity information 410 and the message content are transported on different channels between the mobile terminal 310 and the serving base station equipment.

Figure 7:
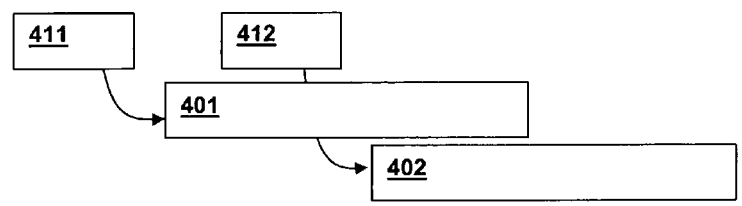
FIG. 7 schematically illustrates an example of the transmission of two broadcast messages using different transport channels.

Schematically, this is represented in FIG. 7, where the first example 411 of the geographical validity information 410 and a second example 412 of the geographical validity information 410 are shown together with corresponding message contents of the broadcast messages. The first example of a message content 401 corresponds to the first example 411 of the geographical validity information and a second example of a message content 402 corresponds to the second example 412 of the geographical validity information 410.

In an embodiment, this correspondence is realized by way of a reference information transmitted as a part of the geographical validity information 410 (but not necessarily together with the geographical validity information 410). By transmitting the reference information, it is possible to link the geographical validity information 410 of a given broadcast message 400 and the content thereof. In the example represented in FIG. 7, a first and a second broadcast message is schematically shown. The first given broadcast message includes the first example 411 of the geographical validity information as well as the corresponding content 401 of this broadcast message, and the second given broadcast message includes the second example 412 of the geographical validity information as well as the corresponding content 402 of this broadcast message.

In an embodiment, the first and second examples 411, 412 of the geographical validity information 410 are transported on a control channel, e.g. the MCCH (Multicast Control Channel) of UMTS or LTE and the corresponding message contents 401, 402 of the corresponding broadcast messages 400 are transported on different channels, such as different transport channels, e.g. a first MTCH (Multicast Transport Channel) of UMTS or LTE and a second MTCH. By way of a reference information linking the geographical validity information to the message content of a given broadcast message, the first example 411 of the geographical validity information 410 refers to (or includes an indication) to the first message content 401 (by a first reference information) and the second example 412 of the geographical validity information 410 refers to (or includes an indication) the second message content 402 (by a second reference information). In the case where the message contents 401, 402 are transmitted after the respective examples 411, 412 of the geographical validity information (i.e. the first message content 401 is transmitted after the first example 411 of the geographical validity information 410 and the second message content 402 is transmitted after the second example 412 of the geographical validity information 410), it is possible for the mobile terminal 310 to ignore a message content 401, 402 when a result of a validation of the corresponding example 411, 412 of the geographical validity information 410 relative to the geographical location/location information 420 of the mobile terminal 310 is negative (this means that a decoding of the corresponding message content 401, 402 takes only place in case that this validation is positive). In an embodiment, for a given broadcast message (including a geographical validity information and a message content corresponding to each other), between the end of the transmission of the geographical validity information and the beginning of the transmission of the corresponding message content of the broadcast message, there is provided a time delay of at least one Transmission Time Interval (TTI). This allows the mobile terminal to validate the geographical validity information prior to the beginning of the transmission of the corresponding message content of the broadcast message 400 such that the reception and the decoding of contents of broadcast messages 400 can be avoided with regard to such broadcast messages 400 that are detected (by the mobile terminal 310) to be non-relevant.

In the following, the selective handling of a broadcast message 400 in only a limited geographical area (subarea 119) of a cell 100 is described exemplarily for a rural macro cell of an LTE system supporting eMBMS functionality for message delivery and a geo-aware User Equipment (UE) 310.

In order to allow a selective handling of broadcast messages 400, the cellular network 300 provides geo-location information (geographical validity information 410) in addition to the broadcast messages 400 in order to allow the mobile terminal 310 or UE 310 in a limited sub area 110 of the cell 100 to handle or tread received broadcast messages 400 differently and in dependence on the present location and/or the present direction of travel of the mobile terminal 310. Therefore the method will indicate the area in which the broadcast messages shall be handled and eventually be presented to the end customer/application by the UE by way of a network defined area, i.e. the subarea 110. The defined area or subarea 110 is preferably configured by geographical coordinates which describe the geographical area for broadcast reception.

In order to define the geographical area or subarea 110 within the macro cell 100 for broadcast reception, different methods are applicable. For example, methods being based on GPS coordinates are possible to apply for such a definition of the subarea 110. To define a subarea 110 (also called reception area) the network 300 can configure the reception area 110 by defining a reference point and a radius which describes the reception area 110. The reference point is described as a longitude and latitude (long & lat) and the radius R defines the maximum distance around the reference point in which the broadcast messages shall be received or specifically handled by mobile terminals 310. Based on the actual coordinates of the mobile terminal 310 and the configured broadcast reception area 110, the mobile terminal 310 can decide if its current position is within the defined broadcast reception area 110 or outside.

When the UE's current position is within the broadcast reception area 110, the reception part in the UE 310 will forward the received broadcast messages 400 to the terminal application for further processing purpose (e.g. to display the content to the user, use it for further processing, etc) and when the UE 310 is outside the defined broadcast reception area 110 the received messages will be handled differently, e.g. be discarded.

A further optimization allows for a more precise or selective definition of the broadcast reception area than the definition by a reference position and a radius: If the configuration is performed by multiple reference points, the method allows for a definition of a polygon as the reception area 110 for the broadcast reception. E.g. if three reference points (e.g. given as GPS coordinates) are defined and the reference points are connected by the application which maintains the definition of the broadcast reception area 110, the broadcast reception area 110 will span a triangle in which the UE 310 would receive the broadcast message 400. If four reference points are defined and the reference points are connected by the application which maintains the definition of the broadcast reception area 110, the broadcast reception area 110 will span a tetragon or a rectangle in which the UE 310 would receive the broadcast messages 400; and so on. If a larger number of reference points are defined which are connected (in the following referred to as "polygon") a fine granular definition of the broadcast reception area 110 within the cell 100 area is possible.

The definition of the broadcast reception area 110 as exemplarily illustrated above is not limited to the definition of a subarea 110 within the coverage area of a single cell 100, but the broadcast reception area (e.g. a polygon) can be freely defined also spanning over more than one cell 100 such that a continuous geographic area 120 is defined including a multitude of subareas 110 related to a multitude of radio cells 100 concerned.

In the following, a practical application of the method is explained exemplarily for the selective broadcast of traffic information. Today, traffic information is broadcast by radio stations, e.g., in a non-selective manner in a greater area than usually needed. Typically the granularity is the area in which the radio station can be received (typically a region extending over many tens of kilometers up to many hundreds of kilometers, e.g. a federal state in Germany (Bundesland)). A similar situation is valid for the automatic traffic information notification for navigation systems for dynamic traffic routing. Broadcasting technologies in cellular networks like eMBMS (evolved Multicast Broadcast Multimedia Service) for LTE (Long Term Evolution) networks were also designed to deliver information like traffic information, weather forecasts, news tickers, stock information, etc. to mobile users. The current limitation for MBMS (Multicast Broadcast Multimedia Service) for UMTS and eMBMS (evolved Multicast Broadcast Multimedia Service) for LTE (Long Term Evolution) is the granularity of the so-called MBMS (Multicast Broadcast Multimedia Service) service area. According to the current definition of (e)MBMS in 3GPP (Third Generation Partnership Project), the minimum granularity of a (e)MBMS service area is a cell, but typically more than a single cell defines a MBSFN service area, such as defined in the technical specifications according to document 3GPP TS 36.300 v.9.0.0, which is incorporated by reference in the present patent application, especially chapter 15.

Embodiments of the present invention provide a method to allow the selective handling of broadcast messages 400 in a subarea 110 of a cell 100 or a freely defined reception area (continuous geographic area 120) within the (e)MBMS service area if this (e)MBMS service area includes more than a single cell 100.

For the example of traffic information, especially in case of geographically limited effect like an accident warning, a warning about items on the road (lost car parts, etc) or cars driving on the wrong side of the road, it is advantageously possible to broadcast such information only in the next vicinity of such an event to notify only the car drivers which are about to enter the area of problem and not all car drivers in a big area like (extending over many tens of kilometers up to many hundreds of kilometers, e.g. a federal state in Germany (Bundesland)) when using classical radio broadcast notification per voice or in an entire cell when using (e)MBMS, where the notification area is at minimum a single cell (which can have a size of typically 5 kilometers to 20 kilometers and in some cases up to 135 kilometers or more).

Especially with the start of having mobile terminals 310 with data capabilities and GPS functionality integrated in cars for emergency services like eCall (such as defined in the technical specifications according to document 3GPP TS 26.267, which is incorporated by reference in the present patent application) which is mandatory for new cars in the European Union starting from September 2010, the foundation for using a GPS-based method especially in cars to allow for a more granular (finer granular) notification method is already laid. Therefore in the following a more detailed description of an exemplary implementation of the inventive method is given for a car notification scenario to warn about a dangerous item on a motorway.

If the police for example are notified by for example a notification call that on a specific motorway (e.g. motorway 123) at a specific location (e.g. km 100) some dangerous item has been identified or a car driving on the wrong side of the road has been seen, it might use this method to distribute a warning message to all cars in the radius of for example 1 km in order to allow them to slow down their speed or only drive on the right lane. According to a conventional system, the police would inform radio broadcast stations about the situation and an (immediate) voice based notification will be sent over the public radio to warn the car drivers. The disadvantages of this method are clear:
  a. The current radio program must be disrupted for the traffic warning
  b. The car drivers must have turned on their radio and listen to the verbal warning message (if they listen to CD or MP3 the automatic traffic notification must be enabled to receive the warning at all)
  c. The car driver need to understand where he/she currently is, i.e. he or she has to decide whether the dangerous situation is relevant or not, i.e. questions like "On which motorway am I?", "at which km/near which junction?", "heading towards the problem or is it already behind me?"
  d. In case of a sufficiently high number of such warning messages at a single time, the driver is simply confused and might not select the relevant information for him or her.

With the advent of new technologies like installed or stand-alone navigation systems in cars combined with cellular radio technology of any kind (GSM/UMTS/LTE/LTE-A etc) and the presence of GPS for location estimate a good basis of an enhancement of the handling and/or delivery of traffic warning information is given. On the other hand car technology takes up with latest technology for driver information like the commercial usage of so-called "head-up displays" which are basically a transparent display in the view scope of the driver and used to display relevant information to the driver without the need to change the view from the street to a classic display.

For illustration purposes only, it is assumed that the car is equipped with cellular radio capabilities (e.g. LTE), a GPS receiver for positioning and a display for displaying the warning messages. E.g., such a car is subscribed per default or on demand to a traffic information service provided by eMBMS. For this exemplary embodiment of the invention, continuous reception of the eMBMS service and the GPS receiver is assumed as there are no power limitations due to the supply via the electrical power system of the car.

For example as the point of danger is reported to the police they trigger the broadcast of a warning message 400 to all cars on that motorway at the respective location (e.g. motorway 123 for km 100). The notification shall be broadcast to all cars, e.g., between km 98 and the point of danger (km 100) on the lanes heading northwards (as not relevant for the lanes heading south).

Therefore, the eMBMS service delivers the warning messages as broadcast messages 400 (e.g. in text form or in graphic form—but not limited to) in the cell 100 or the cells 100 of the mobile telecommunications network 300 which span the described warning notification area (i.e. between km 98 and the point of danger (km 100) on the lanes heading northwards). To allow such a selective handling of the warning messages 400, the reference location (lat/long) where the point of danger happened could be provided together with the eMBMS warning message. Together with the provision of a radius of, e.g., 2 km (to notify the cars between km 98 and km 100 on motorway 123) the car drivers heading northwards towards the problem area would be warned. In such a configuration, all car users in the area of 2 km around the reference point would be warned (especially also those one which are not using the motorway at all). To even enhance the specificity of the handling of the broadcast messages 400, it is proposed to use a definition of a polygon for the relevant warning area. In this case the warning message should be only delivered to those cars heading northwards on motorway 123 between km 98 and km 100. Therefore a polygon needs to be defined which is much more precise than the circle in the example above. For this particular example a rectangular polygon with, e.g., a width of 100 m and length of 2000 m would be defined and placed to cover the motorway 123 from km 98 to km 100. Using this more precise definition of the warning notification area, mainly the cars on the respective motorway 123 in the area between km 98 and km 100 would be notified. By such a definition of the warning notification area (or continuous geographic area 120 or subarea 110), also the mobile terminals 310 in cars heading southwards would be concerned. To provide a still more adapted handling of the broadcast messages 400, a further embodiments provides for validating the broadcast message received by the mobile terminal 310 dependent on the direction of travel of the mobile terminal 310, i.e. only cars driving northwards are informed. This can be done by providing additional heading information to the cars in the defined warning notification area. Typically, the direction of travel of the mobile terminal 310 will be stored within the mobile terminal 310. The direction of travel (of the mobile terminal 310) taken into consideration when evaluating the geographical validity information 410 can, e.g., be one out of the following:
  the current (or instantaneous) direction of travel of the mobile terminal 310,
  an average direction of travel corresponding to a predetermined (previous) interval of time or corresponding to a predetermined (previously traversed) distance, in case that the mobile terminal is currently more or less stationary, the last measured direction of travel of the mobile terminal.

Technically the additional information for each localized broadcast message defines a geographic area or region by at least one reference point (lat/long) and a radius (R). Broadcast receivers only in this geographic region shall use the broadcast message for further processing (e.g. display purposes). Advantageously the definition of the geographic region can be done more precisely by the definition of a freely defined polygon which in the simplest way consists of 3 or four reference points (lat/long) but can be enhanced by a higher number of reference points. As another advantageous enhancement, heading information is also provided to filter the broadcast messages for terminal (in cars for example) heading towards the indicated direction.

Geographical validity information (or delivery information) can be delivered together with the broadcast message. Exemplarily in eMBMS using LTE technology this can be done in the lower layers (according to the OSI-Model (Open Systems Interconnections Model) definitions, e.g. layers 2 or 3), either on the MTCH (eMBMS Traffic Channel) which carries the broadcast message or preferably on the MCCH (eMBMS Control Channel).

In an alternative embodiment of the invention, the geographical validity information is provided together with the message content (of the broadcast message) in an application layer protocol.

In a further embodiment, additional information elements are used to define the delivery area. In an example, the information element could be structured as follows:

| | |
|---|---|
| Selective delivery | yes/no |
| Handling Area | GPS defined |
| Reference point 1 | 50.800° N 7.000° E |
| Reference point 2 | 50.801° N 7.003° E |
| Reference point 3 | 50.781° N 7.019° E |
| Reference point 4 | 50.780° N 7.015° E |
| Heading dependent | yes/no |
| Heading | 140 . . . 170 degree |
| Delivery when stationary | yes/no |
| . . . | . . . |

In a further embodiment, the principle of selective delivery can also be enhanced with a procedure which allows messages 400 to be received in an area larger than the concerned delivery area 110 and the message 400 is stored in such a manner that once the concerned delivery area is reached, the message 400 is displayed, i.e. the message is stored in the mobile terminal 310 in a waiting state or in a "delivered for display purpose". An optional storage time could also be used in such a case.

The invention claimed is:

1. A method for sending broadcast messages in a mobile telecommunications network to mobile terminals within a local radio coverage area of the mobile telecommunications network, wherein the radio coverage area has a radio access network entity for broadcasting the broadcast messages, the method comprising:

receiving, by a mobile terminal, geographical validity information corresponding to a broadcast message from the radio access network entity, wherein the geographical validity information is based on a definition of a subarea of the radio coverage area and includes reference information pointing to content of the broadcast message;

validating, by the mobile terminal, prior to transmission of the content of the broadcast message to the mobile terminal, the geographical validity information relative to a geographical location of the mobile terminal; and receiving, by the mobile terminal, the content of the broadcast message based on the reference information and decoding, by the mobile terminal, the content of the broadcast message, wherein receiving and decoding the content of the broadcast message is only in response to positive validation of the broadcast message.

2. The method according to claim 1, wherein the local radio coverage area is a cell of the mobile telecommunications network having a base transceiver station as the radio access network entity, and wherein a minimum granularity for the handling of the broadcast message is restricted to the area of such a cell.

3. The method according to claim 1, wherein the geographical validity information of the broadcast message is transmitted to the mobile terminal on a control channel and the content of the broadcast message is transmitted to the mobile terminal on a transport channel.

4. The method according to claim 1, wherein transmission of the broadcast message from the radio access network entity to the mobile terminal is performed using at least one of the group consisting of: SMS-CB (Short Message System Cell Broadcast), MBMS (Multicast Broadcast Multimedia Service), eMBMS (evolved Multicast Broadcast Multimedia Service), PWS (Public Warning System), ETWS (Earthquake and Tsunami Warning System), or CMAS (Commercial Mobile Alert System), and any other broad- or multicast system, including DMB (Digital Multimedia Broadcasting), DVB (Digital Video Broadcast) -H/-T/-S, and WiBro.

5. The method according to claim 1, wherein the geographical validity information defining the subarea includes at least one GPS reference point.

6. The method according to claim 5, wherein the geographical validity information defining the subarea further includes radius information defining a circle relative to the at least one GPS reference point.

7. The method according to claim 5, wherein the geographical validity information defining the subarea includes at least three GPS reference points.

8. The method according to claim 1, wherein the geographical validity information comprises a direction dependent indication allowing the mobile terminal to validate the broadcast message dependent on the geographical validity information and dependent on the direction of travel of the mobile terminal.

9. The method according to claim 1, wherein the geographical validity information refers to a continuous geographic area corresponding to a multitude of subareas of a multitude of cells of the mobile telecommunications network.

10. The method according to claim 1, wherein the broadcast message is transmitted to a further mobile terminal within the local radio coverage area of the mobile telecommunications network, the further mobile terminal lacking location information related to the geographical location of the further mobile terminal, wherein the further mobile terminal validates or invalidates the broadcast message.

11. A system for sending broadcast messages, the system comprising:

a mobile telecommunications network; and a mobile terminal within a local radio coverage area of the mobile telecommunications network; and a radio access network entity within the radio coverage area for broadcasting the broadcast messages;

wherein geographical validity information corresponding to a broadcast message is based on a definition of a subarea of the radio coverage area and includes reference information pointing to content of the broadcast message;

wherein the mobile terminal is configured to:
  receive the geographical validity information;
  validate, prior to transmission of the content of the broadcast message to the mobile terminal, the geographical validity information relative to a geographical location of the mobile terminal; and
  receive the content of the broadcast message based on the reference information and decode the content of the broadcast message only in response to positive validation; and ignore the content of the broadcast message in response to negative validation.

12. The system according to claim 11, wherein the local radio coverage area is a cell of the mobile telecommunications network having a base transceiver station as the radio access network entity, and wherein a minimum granularity for the handling of the broadcast message is restricted to the area of such a cell.

13. The system according to claim 11, wherein the mobile telecommunications network is a network according to at least one of the group consisting of: UMTS (Universal Mobile Telecommunications Standard), cdma2000 (Code Division Multiple Access 2000), LTE (Long Term Evolution), LTE-Advanced (Long Term Evolution Advanced), and WiMAX (Worldwide Interoperability for Microwave Access) standard.

14. The system according to claim 11, wherein the geographical validity information defining the subarea includes at least one GPS reference point.

15. A mobile terminal located within a local radio coverage area of a mobile telecommunications network, the mobile terminal comprising:
  a memory for storing computer-executable instructions;
  a processor for executing the computer-executable instructions, wherein execution of the computer-executable instructions causes the mobile terminal to:
    receive geographical validity information corresponding to a broadcast message, wherein the geographical validity information is based on a definition of a subarea of the radio coverage area and includes reference information pointing to content of the broadcast message;
    validate, prior to transmission of the content of the broadcast message to the mobile terminal, the geographical validity information relative to a geographical location of the mobile terminal; and
    receive the content of the broadcast message based on the reference information and decode the content of the broadcast message in response to positive validation; is and ignore the content of the broadcast message in response to negative validation.

16. A non-transitory computer-readable medium having computer-executable instructions for receiving a broadcast message in a mobile telecommunications network within a local radio coverage area of the mobile telecommunications network stored thereon, the computer-executable instructions, when executed by a processor, causing the following steps to be performed:
  receiving geographical validity information corresponding to the broadcast message, wherein the geographical validity information is based on a definition of a subarea of the radio coverage area and includes reference information pointing to content of the broadcast message;
  validating, prior to transmission of the content of the broadcast message to the mobile terminal, the geographical validity information relative to a geographical location of the mobile terminal; and
  receiving the content of the broadcast message based on the reference information and decoding the content of the broadcast message in response to positive validation; and ignoring the content of the broadcast message in response to negative validation.

\* \* \* \* \*